United States Patent [19]

Schmidt

[11] Patent Number: 4,982,081
[45] Date of Patent: Jan. 1, 1991

[54] AMBIENT LIGHT REJECTING QUAD PHOTODIODE SENSOR

[75] Inventor: Terrence C. Schmidt, Wellesley, Canada

[73] Assignee: Electrohome Limited, Kitchener, Canada

[21] Appl. No.: 401,961

[22] Filed: Sep. 1, 1989

[51] Int. Cl.⁵ .............................................. H01J 40/14
[52] U.S. Cl. ................... 250/208.2; 250/214 C
[58] Field of Search .............. 250/208.2, 214 C, 210, 250/238, 349, 214 B; 358/213.16; 374/130, 124, 178

[56] References Cited

U.S. PATENT DOCUMENTS

| | | | |
|---|---|---|---|
| 3,962,722 | 6/1976 | Ciciora | 358/10 |
| 4,441,120 | 4/1984 | Gerritsen | 358/10 |
| 4,602,272 | 7/1986 | Duschl | 358/10 |
| 4,630,121 | 12/1986 | Suzuki | 358/213.16 |
| 4,642,529 | 2/1987 | Penn | 315/368 |
| 4,659,930 | 4/1987 | Johnson | 250/214 C |
| 4,683,467 | 7/1987 | Macaulay et al. | 340/105 |
| 4,800,278 | 1/1989 | Taniguti | 250/349 |
| 4,879,470 | 11/1989 | Sugawa | 358/213.16 |

Primary Examiner—David C. Nelms
Attorney, Agent, or Firm—Webb, Burden, Ziesenheim & Webb

[57] ABSTRACT

An ambient light rejecting quad photodiode sensor having compensation diodes connected with reverse polarity to respective quadrant photodiodes within the sensor, the compensation diodes being located outside of the area of illumination. By direct connection of compensation diodes in reverse polarity to each quadrant of the quad photodiodes, a large boost in signal to noise ratio is achieved for eliminating the effects of ambient room light as well as sensor dark current.

13 Claims, 3 Drawing Sheets

AMBIENT LIGHT REJECTING QUAD PHOTODIODE SENSOR

FIELD OF THE INVENTION

This invention relates in general to video projection convergence systems, and more particularly to an ambient light rejecting quad photodiode sensor for use in a convergence system.

BACKGROUND OF THE INVENTION

Video projection systems are well known for projecting a composite colour image on a flat wall, rear screen or curved front screen surface. The image is generated via three coloured light beams (red, green and blue) which are centered and focused for convergence at a centre point of the screen.

Since the respective coloured light beams are projected at different angles for focusing at the centre point, mis-registration of the images is known to occur on the edges of the screen, etc.

In order to correct the problem of mis-registration of images in projection video systems, convergence systems have been developed for deflecting respective ones of the beams by predetermined amounts in accordance with information input to the convergence system by an operator using a cursor control, etc.

More recently, automatic convergence systems have been developed which utilize sensors for detecting mis-registration of a projected image at various zones on the screen and automatically deflecting the electron beams by the required amounts for obtaining convergence of the image without user input. The sensors in known automatic convergence systems have typically been fabricated using CCD arrays. The CCD arrays detect and digitize the projected image, which is then processed via microprocessor circuitry for detecting mis-registration. In response to detecting mis-registration, the microprocessor circuitry generates appropriate convergence coil signals, etc. A disadvantage of CCD based sensors is that such sensors integrate the image over an entire raster frame. Accordingly, the signal-to-noise ratio of the detected image relative to detected ambient light is very low. As a result, CCD image sensors are characterized by poor image detection, especially in relation to blue phosphor.

In order to overcome the disadvantages resulting from the use of CCD sensors, a number of prior art attempts have been made at using photodiode arrays for detecting the projected image. Because a photodiode array is peak sensitive, as opposed to time averaging as in CCD sensors, the intensely high peak intensities from a CRT phosphor can be readily sensed from low reflectivity surfaces such as rear screens and off-axis high-gain (i.e. curved) front screens.

For example, U.S. Pat. No. 4,642,529 (Sperry Corporation) discloses a photoresponsive sensor carried by an X-Y mount. The sensor is used for providing precise convergence measurement of beams in a CRT display by sensing the displacement of brightness peaks by an array of phosphorescent regions which are sequentially illuminated on the display screen. Convergence is calculated by calibrating the recorded brightness peaks as a function of beam displacement. The system is adapted to measure both vertical and horizontal components as well as line width.

U.S. Pat. No. 4,683,467 (Hughes Aircraft Company) discloses an image registration system in which a plurality of sensors are provided—one for each projected colour image. Each sensor comprises three photodetectors which are disposed in a right angle relationship for determining the position of a registration pattern on the screen. The degree of incidence of the registration pattern upon the photodetectors results in varying amounts of photocurrent generated thereby. By comparing the photocurrents produced by the horizontal and vertical photodetectors, different signals are produced, thereby indicating that the registration pattern is either in registration or out of registration.

U.S. Pat. Nos. 3,962,722 (Zenith Radio Corporation) and 4,441,120 (Philips Corporation) contemplate the use of quadrant photodetectors in a convergence system.

More particularly, the Zenith patent discloses a plurality of photocells which are preferably in a generally rectangular array. Similarly, the Philips patent discloses a square photosensitive cell consisting of four surface photodiodes placed in a quadrant for centering an electron beam on the crossing of the four diodes by comparing the signals generated by the photodiodes.

Although the above references discussed teach the use of quadrant photodiodes sensors in a convergence system, thereby overcoming some of the disadvantages of prior art CCD arrays, each of the prior art quad sensor configurations suffer from poor efficiency resulting from sensor dark current and ambient room light illuminating the sensor.

More particularly, since in many industrial applications the room lighting cannot be turned off, the sensors are exposed to considerable ambient light, thereby reducing the signal-to-noise detection ratio of the sensors. The colour blue is particularly difficult to distinguish in the presence of ambient light since the ambient light tends to "wash out" a blue image.

Furthermore, it is well known that a dark current is generated by photodiodes in proportion to the temperature operation of the photodiodes. Thus, thermally generated dark current within the prior art sensors further contributes to the reduced signal-to-noise detection ratio.

SUMMARY OF THE INVENTION

According to an aspect of the present invention, compensation diodes are connected with reverse polarity to respective ones of the quadrant photodiodes in the sensor. The compensation photodiodes are located outside of the illumination area of the quadrant photodiodes such that the illuminated image falls only on the inner photodiodes whereas ambient light illuminates both the quadrant and compensation photodiodes. Accordingly, both the compensation and quadrant photodiodes generate equal but reverse photogenerated currents in response to the ambient light. The photogenerated currents due to ambient light cancel, leaving only the current due to illumination of the inner photodiodes by the image.

An additional advantage of the present invention is that the dark current generated by the compensation diodes is equal and in opposite direction to the dark current generated by the respective inner quadrant photodiodes, since both photodiodes are electrically matched and operate at the same temperature.

Thus, according to a general aspect of the present invention, there is provided an optical sensor comprising a plurality of first photodiodes arranged in an array and connected together with like polarity, the improvement comprising a plurality of further photodiodes connected in parallel with, and with opposite polarity to respective ones of said first photodiodes, for compensating the effects of ambient light and sensor dark current within said first photodiodes.

BRIEF DESCRIPTION OF THE DRAWINGS

A preferred embodiment of the present invention will be described in greater detail below with reference to the following drawings, in which.

DETAILED DESCRIPTION OF THE INVENTION

Figure 1:
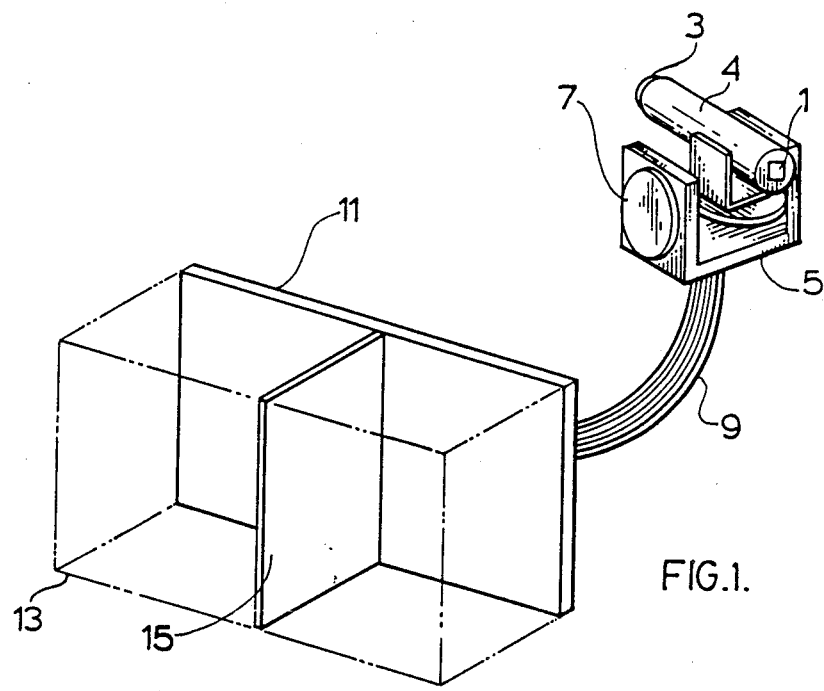
FIG. 1 is a schematic illustration of a convergence system employing a quad photodiode sensor in accordance with the present invention.

Turning to FIG. 1, a convergence system is shown comprising a quadrant photodiode sensor 1 in association with imaging lens 3 and mounted on an X/Y motor assembly 5. The sensor/motor assembly 5 consists of a mechanical structure supporting two stepper motors 7 in an X/Y gimbal configuration for orienting the imaging lens 3 and sensor 1 to focus on a projected image (not shown), and a tubular housing 4 containing the lens 3 at one end and the sensor 1 at the other end. The sensor is attached to a small surface mount preamplifier board, as discussed below with reference to FIG. 3.

Preferably, the sensor/motor assembly 5 is attached to the frame of a projector (not shown) directly beneath the center (green) lens thereof.

A wire harness 9 connects the quadrant photodiode sensor 1 and motors 7 to a motherboard 11 within a card cage 13 supporting a main printed circuit board 15 which contains the circuitry for operating the motors 7 and digitizing the signals received from the quadrant photodiode sensor 1, as discussed in greater detail below with reference to FIGS. 3 and 4.

The positions of the red, green and blue image components at the projected image point are detected by the sensor 1 and adjusted to coincide with the center of in a manner similar to that discussed above with reference to U.S. Pat. No. 4,683,467 (Hughes Aircraft). Full screen convergence is effected by repeating the operation for a multiplicity of convergence points of the entire raster image, in a well known manner.

The automatic convergence operation is initiated by making a selection from a convergence menu via the projector's remote or built-in key-pads (not shown). Thereafter, software running in the convergence system assumes control of the projector until completion of the convergence or until aborted by a user. During the operation, the microprocessor uses the video control board (not shown, but incorporated in card cage 13) to display targets and patterns required by the convergence algorithms.

Figure 2:
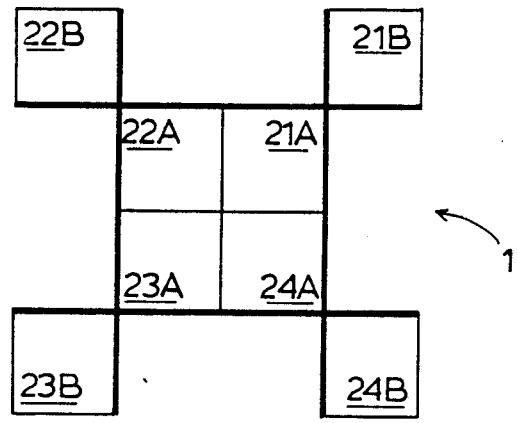
FIG. 2 is a plan view of the quad photodiode sensor in accordance with the preferred embodiment.

Sensor 1 is shown in greater detail with reference to FIG. 2, comprising a quadrant arrangement of four inner photodiodes 21A, 22A, 23A and 24A, and four corresponding and matched reverse biased outer compensation photodiodes 21B, 22B, 23B and 24B. As discussed above, the function of reverse bias compensation diodes 21B–24B is to cancel the effect of ambient light illumination and sensor dark current in the sensor 1. In particular, by direct connection of the compensation diodes 21B–24B in a reverse direction of polarity to respective ones of the quad photodiodes 21A–24A, photogenerated current due to ambient room light is effectively cancelled, as well as temperature generated sensor dark current, resulting in a significant boost in signal to noise ratio of the illuminated image, as well as preventing switching noise of the detected image signal prior to amplification via the preamplifier circuitry discussed below with reference to FIG. 3.

Since the photodiode sensor is peak responding, unlike prior art CCD sensors that integrate over an entire frame, the high peak intensities from a CRT phosphor can be readily sensed by the quad photodiode sensor 1 from low reflectivity surfaces such as rear screens and off-axis high-gain front screens.

The inner photodiodes 21A–24A and outer compensation diodes 21B–24B must be substantially matched such that, under uniform illumination, the compensation diode reverse photocurrent is equal to the inner quadrant diode photocurrent within $+/-10$ percent.

According to a successful prototype, the area of each quadrant and compensation photodiode was $0.8 \times 0.8$ mm, with a metalization separation of 0.1 mm. The compensation photodiodes 21B–24B were placed as close as practical to corresponding respective ones of the inner quadrant photodiodes 21A–24A so as not to exceed a separation of 0.15 mm.

Figure 3:
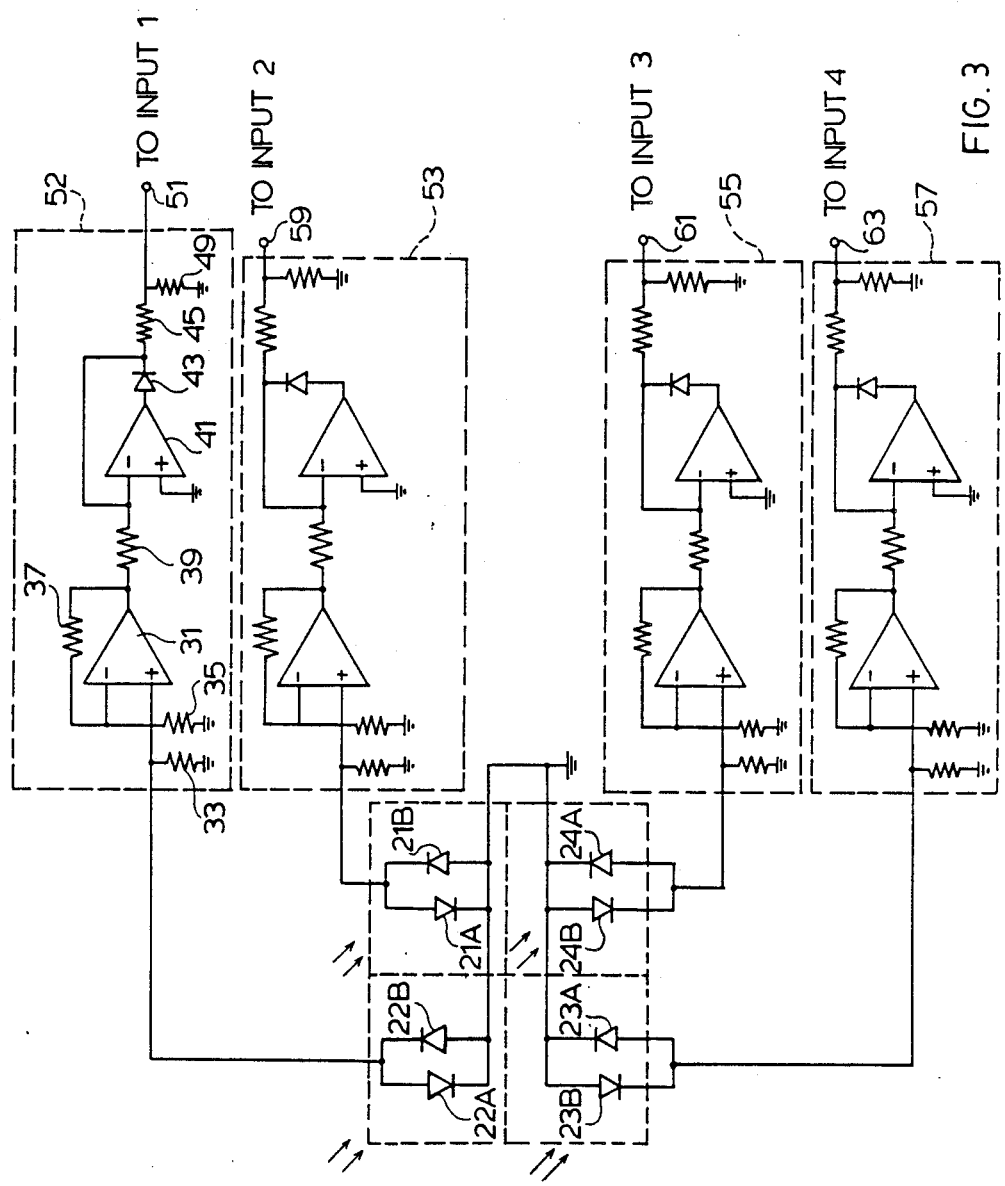
FIGS. 3 and 4 are schematic diagrams of amplifier and conversion circuitry connected to the quadrant photodiode sensor of the preferred embodiment within the convergence system of FIG. 1.

Turning to FIG. 3, preamplifier circuitry shown connected to the sensor 1. As discussed above, the circuitry is preferably disposed on a surface mount board attached to the tubular portion 4 of the sensor/motor assembly 5.

The sensor 1 is shown schematically in FIG. 3 comprising four quadrants, each including parallel reverse oriented photodiode pairs. Each of the inner quadrant photodiodes 21A–24A have their anodes connected in common to ground. Respective cathodes of the inner photodiodes 21A–24A are connected to respective preamplifier circuits 52–57, as discussed below. Each of the compensation photodiodes 21B–24B is shown connected with reverse polarity across corresponding ones of the inner quadrant photodiodes 21A–24A.

The parallel combination of photodiodes 22A and 22B are shown connected to preamplifier circuit 52. More particularly, the cathode of photodiode 21A and anode of photodiode 22B are connected to a non-inverting input of a differential amplifier 31. Biasing resistors 33, 35 and 37 are shown connected in a well known configuration for setting the gain of non-inverting amplifier 31. An output of 31 is connected via current limiting resistor 39 to the inverting input of a further differential amplifier 41. A non-inverting input of amplifier 41 is connected to ground, and an output of amplifier 41 is connected via diode 43 to the inverting input thereof. Amplifier 41 is configured to function as a precision limiting AC/DC convertor, according to a well known design. The output of amplifier 41 is also connected via diode 43 to a combination of output load resistors 45 and 49 and therefrom to an output terminal 51, in a well known manner.

Circuits 53, 55 and 57 are shown in dashed outline connected to respective photodiode pairs 21A and 21B, 24A and 24B, 23A and 23B, and operate in an identical manner to preamplifier circuit 52.

Figure 4:
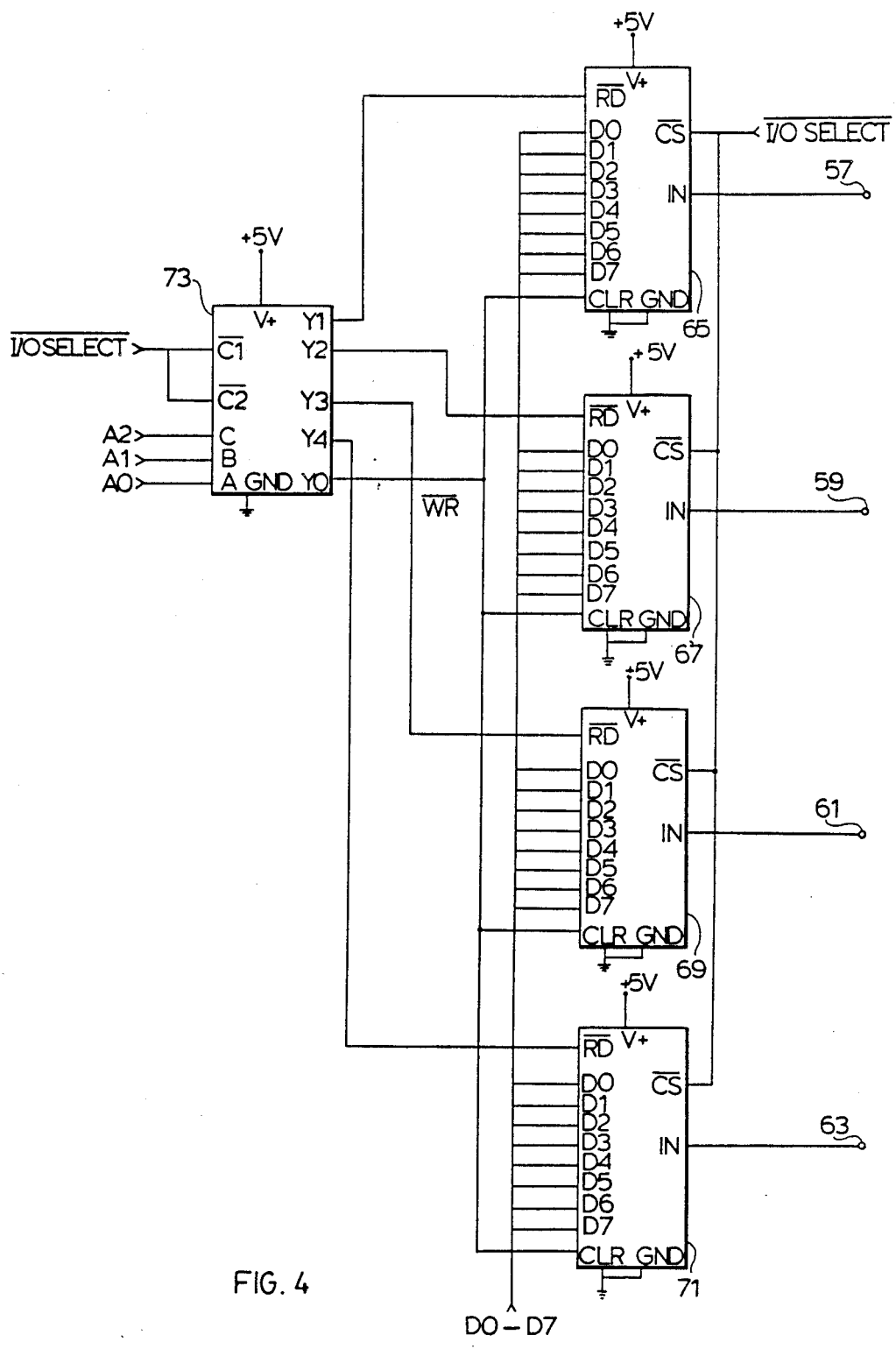

Turning to FIG. 4, output terminals 51, 59, 61 and 63 from respective ones of the preamplifier circuits (FIG.

3) are shown connected in a well known manner to respective inputs (IN) of analogue-to-digital converters 65, 67, 69 and 71. Output terminals D0–D7 of convertors 65–71 are connected to a databus of the convergence system microprocessor (not shown). Respective ones of the analogue-to-digital converters 65–71 are selected via a 3-to-8 selector circuit 73 responsive to predetermined combinations of microprocessor address bits A0, A1 and A2 being applied to the control inputs A, B, and C thereof. In particular, demultiplexed outputs Y1–Y4 are connected to respective read inputs (RD) of converters 65–71. The Y0 output of 3-to-8 selector 73 is connected to the write enable input WR for each of the converters 65–71.

In operation, ambient light-generated photocurrent and dark current are cancelled in the respective pairs of photodiodes 21A and 21B to 24A and 24B, while respective photocurrents generated by positions of the single colour image illuminating photodiodes 21A-24A are applied to respective preamplifier circuits 52–57. The preamplifier circuits perform necessary gain adjustment and AC filtering of the detected image photocurrent signals, and in response generate respective DC voltages (i.e. photovoltic potentials) proportional to the position of the image on the respective photodiodes 21A-24A. These DC signals are applied to respective inputs of converters 65–71 which in response generate respective 8-bit digital values for application to the convergence system microprocessor databus, as discussed above. By comparing the respective 8-bit values, the microprocessor is able to detect mis-registration of the image and in response generate the required convergence coil correction signals, in a well known manner.

In summary, the quadrant photodiode sensor 1 of the present invention is adapted for use in a microprocessor controlled convergence system for detecting colour misconvergence of the three primary colours on a projector screen. In response, the convergence system corrects the registration of the colours automatically, without operator intervention. The sensor configuration of the present invention is used to detect a spot of light projected from one colour gun of a CRT projector, with a high degree of positional accuracy. By sequentially measuring each colour, corrective action is undertaken by the convergence system.

Moreover, according to the present invention, compensation diodes are connected to respective ones of the inner quadrant photodiodes, in order that the sensor may operate under high ambient light conditions on flat white, and high-gain front and rear screens. By connection of the compensation photodiodes in a reverse direction of polarity to each quadrant of the sensor, a large boost is provided in the signal-to-noise ratio achieved by the sensor. This essentially cancels the effects of unwanted ambient room light as well as sensor dark current, and prevents switching noise before the signal is fed to the sensitive low noise preamplifiers discussed with reference to FIG. 3.

Other embodiments and modifications of the invention are possible. For example, the novel sensing and compensation photodiode arrangement of the present invention may be used in sensors other than the quadrant sensor 1 of the preferred embodiment. In particular, a fewer or greater number photodiode elements may be used. As an example, a three inner-photodiode sensor may be devised with the configuration disclosed in U.S. Pat. No. 4,683,467, as discussed above. Indeed, the advantages of connecting a reverse compensation photodiode to a light or image sensing photodiode may be achieved in a system in which only a single sensing photodiode is used, such as in an optical interrupting switch, etc. It is contemplated that numerous applications of the principles of the present invention are possible outside of the field of video projection technology.

All such modifications and variations are believed to be within the sphere and scope of the present invention as defined by the claims appended hereto.

I claim:

1. A photodiode array for detecting a projected image in the presence of ambient light, comprising at least three image sensing photodiodes connected in parallel with like polarity and arranged at right angles, and at least three further photodiodes connected in parallel with and with reverse polarity to respective ones of said image sensing photodiodes for compensating the effects of said ambient light on said image sensing diodes.

2. A photodiode array as defined in claim 1, comprising four said image sensing photodiodes arranged in a quadrant and four said further photodiodes disposed at respective corners of said quadrant.

3. The photodiode array of claim 1, wherein said further photodiodes are substantially electrically matched with said image sensing photodiodes.

4. The photodiode array of claim 1, wherein under uniform illumination photocurrent within said image sensing photodiodes is equal to the photocurrent within said further photodiodes within $+/-10\%$.

5. The photodiode array of claim 1, wherein each of said image sensing and further photodiodes has an active area of approximately $0.8 \times 0.8$ mm with a metalization separation of 0.1 mm.

6. The photodiode array of claim 2, wherein said respective ones of said further photodiodes are located within 0.15 mm of said respective corners.

7. A circuit for detecting mis-registration of a projected image in a video system, comprising:
 (a) a photodiode sensor divided into four quadrants adapted to be illuminated by said projected image and in response generating four photovoltaic potentials corresponding to respective portions of said projected image incident on respective quadrants of said sensor;
 (b) each said quadrant of said sensor having a compensation photodiode connected with reverse polarity thereto for cancelling the effects of ambient light on said quadrant;
 (c) means for converting said four photovoltaic potentials to respective digital values; and
 (d) means for detecting inequality of said digital values and in response indicating detection of mis-registration of said projected image.

8. The circuit of claim 7, wherein said photodiode sensor comprises four image sensing photodiodes connected in parallel with like polarity.

9. The circuit of claim 8, wherein each said compensation photodiode is connected at respective corner of said quadrant in parallel with and with reverse polarity to a respective one of said image sensing photodiodes.

10. The circuit of claim 8, wherein each said compensation photodiode is substantially electrically matched with a corresponding one of said image sensing photodiodes.

11. The circuit of claim 8, wherein under uniform illumination photocurrent within said image sensing photodiodes is equal to the photocurrent within said compensation photodiodes within +/−10%.

12. The circuit of claim 8, wherein each of said image sensing photodiodes and corresponding compensation photodiode has an active area of approximately 0.8×0.8mm with a metalization separation of 0.1 mm.

13. The circuit of claim 8, wherein said each said compensation photodiode is located within 0.15 mm of said respective corner.

* * * * *